Sept. 13, 1955 A. A. STANTON 2,717,635
SPRING-END ANCHORING CLIP
Filed Dec. 15, 1952
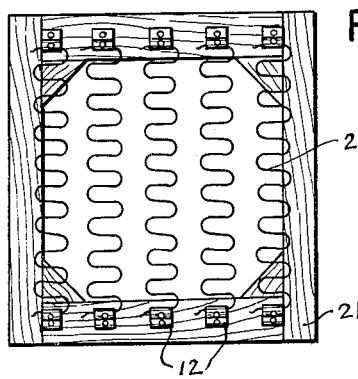
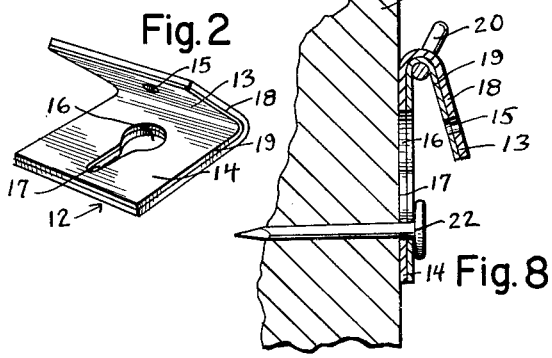
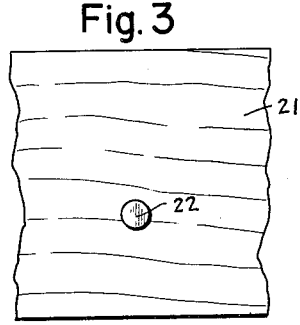
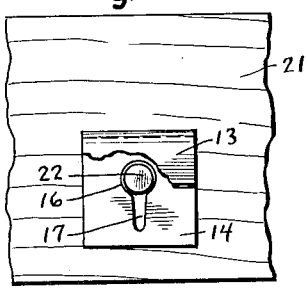
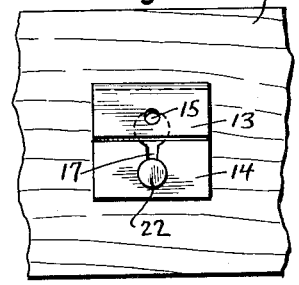
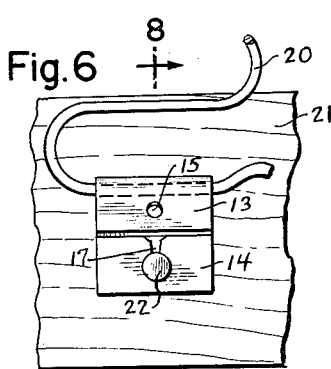
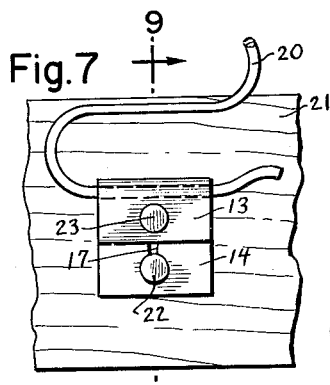
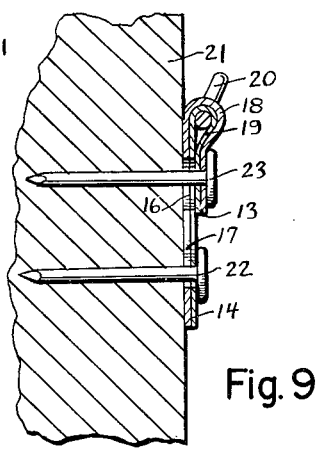
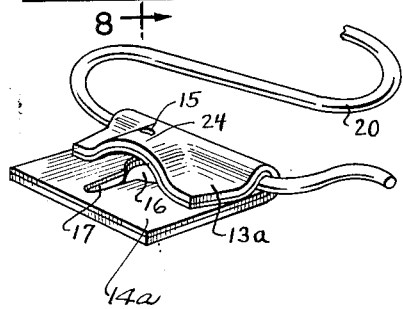
INVENTOR.
Allen A. Stanton
BY Barnes & Leed

2,717,635

SPRING-END ANCHORING CLIP

Allen A. Stanton, Seattle, Wash.

Application December 15, 1952, Serial No. 325,963

3 Claims. (Cl. 155—179)

The present invention relates to spring-end clips for anchoring the ends of longitudinally bowed flat-type springs on furniture frames and aims to provide an improved clip whereby the production time required to secure a gang of such springs in place can be materially shortened.

To elaborate, the spring-end furniture clips presently commonly employed comprise a generally U-shaped clip having one leg longer than the other, the longer leg having a pair of longitudinally aligned holes with the hole closest to the elbow of the clip being complemented by a hole in the shorter leg. In mounting a group of springs the worker must first secure the clips one at a time to the furniture frame by hammering a nail through the hole closest to the free end of the longer leg. Since the clips are quite small difficulty is experienced in setting this nail without hitting the shorter leg and all that the worker can normally hold at once is the hammer, clip, and nail. After the clips are thus initially secured, the springs are mounted with their ends in the elbows of the clips and then a second nail is inserted through the two complementary holes in the legs of each clip and is hammered down into the furniture frame sufficiently to cause the shorter leg to be bent down over the end of the related spring end.

By my invention the two holes in the longer leg of the clips is replaced by a keyhole slot. Accordingly, it is possible for the worker to take a handful of nails and hammer them into the frame leaving their heads slightly raised. He can then slip the clips in rapid succession over the raised heads and finish the operation as before. The invention also contemplates the crimping of my improved clips over the ends of the springs before the latter are secured to the furniture frames.

Other objects and advantages more particularly concerned with details of construction will, with the foregoing, appear and be understood in the course of the following description and claims, the invention consisting in the novel construction and in the adaptation and combination of parts hereinafter described and claimed.

In the drawings:

Figure 1 is a top plan view of a gang of springs anchored to a furniture frame by my improved clips.

Fig. 2 is a perspective view of my improved clip.

Figs. 3 to 7 illustrate the successive steps involved in the application of the clip.

Figs. 8 and 9 are vertical sectional views taken along the lines 8—8 and 9—9 of Figs. 6 and 7, respectively.

Fig. 10 is a perspective view of a modified embodiment of my invention wherein the clip is initially secured to the spring.

Referring to Fig. 2 of the drawings, it is seen that one embodiment of my invention is denoted by the numeral 12 and has a general U-shape with the upper leg 13 being shorter than the lower leg 14. The upper leg is pierced adjacent its free end to provide a hole 15 which overlies the eye 16 of a keyhole slot formed in the lower leg. This slot is arranged with its eye 16 directed toward the elbow of the clip and is of a length sufficient to bring the outer end portion of its narrowed throat 17 free of direct subjacency to the upper leg 13. The main body 18 of the clip is preferably produced from metal stock and is desirably provided with an inner layer 19 of fabric cemented thereto for minimizing any noise caused by relative motion of a spring-end anchored thereby.

For purposes of example a plurality of the clips 12 have been illustrated in operative position anchoring the ends of a group of longitudinally bowed flat-type springs 20 to a simple wooden seat frame 21. These springs have a generally sinusoidal configuration and are arranged in parallel relation traversing the frame.

Commencing with Fig. 3 I have shown the sequence of operation in anchoring the ends of the springs 20 and it will be seen that the first step is the hammering of nails 22 into the frame, one such nail for each clip 12. These nails 22 are not hammered all the way into the frame but are left with their heads protruding above the frame a distance corresponding to the thickness of the clips. It will be appreciated that the worker can speedily accomplish this initial step by taking a handful of the nails 22 and hammer the same in rapid-fire order. As illustrated in Figures 4 and 5, the worker then takes a quantity of the clips 12 and successively inserts the keyhole slot eyes 16 of the clips over the heads of the nails 22 at the same time drawing the clips toward the center of the frame to bring the nails into the narrowed throat 17 of the keyhole slots. The springs 20 are then positioned over the frame with their ends positioned in the elbow of the clips, this step being shown in Figs. 6 and 8. The final step in the operation is portrayed by Figs. 7 and 9 and involves the hammering of nails 23 into the frame, each passed through the hole 15 and keyhole slot eye 16 of the respective clip. The nails 23 are brought down firmly so as to crimp the upper clip legs 13 around the ends of the springs and into snug engagement with the lower legs 14.

In Fig. 10 I have illustrated a modified arrangement wherein the clips are initially secured to the springs. In so securing my clip to a spring end the upper leg 13a thereof is purposely deformed by suitable dies to provide a central ridge 24 whose height slightly exceeds the thickness of the heads of the nails 22 with the remainder of the upper leg being brought down against the lower leg 14a. This ridge 24 permits the clips with the attached springs to be introduced over the heads of the nails 22 as before described. Following this step the nails 23 are inserted and hammered down sufficiently to flatten out the ridge 24 so that the final appearance is the same as that shown in Figs. 7 and 9.

It is thought that the invention will have been clearly understood from the foregoing description of my now-preferred embodiments. Changes in the details of construction will largely suggest themselves and may be resorted to without departing from the spirit of the invention, and it is, consequently, my intention that no limitations be implied and that the hereto annexed claims be read with the broadest interpretation to which the employed language fairly admits.

What I claim is:

1. A spring clip comprising a generally U-shaped member having one of its legs longer than the other, the shorter leg being provided with an aperture and the longer leg being provided with a keyhole slot arranged with its eye directed toward the elbow of the clip in vertical alignment with the said aperture and with its narrowed throat portion extending toward the free end of the longer leg and beyond the shorter leg.

2. A spring clip comprising a generally U-shaped member having one of its legs longer than the other, the shorter leg being formed with a laterally centered ridge having its crest arched away from the plane of the longer leg and provided with an aperture, and the longer leg being provided with a keyhole slot arranged with its eye directed toward the elbow of the clip with the said aperture and with its narrowed throat portion extending toward the free end of the longer leg and beyond the shorter leg.

3. A spring clip comprising a generally U-shaped member having an aperture in one leg and a keyhole slot in the other leg, the eye of said keyhole slot lying toward the bight of the clip and being aligned with said aperture.

References Cited in the file of this patent

UNITED STATES PATENTS

| | | |
|---|---|---|
| 2,166,989 | Gleason | July 25, 1939 |
| 2,215,373 | Krakauer | Sept. 17, 1940 |
| 2,624,890 | Rubinstein | Jan. 13, 1953 |
| 2,663,361 | Diamond | Dec. 22, 1953 |

OTHER REFERENCES

No-Sag Publication, No. 47, June 1947 (page 3).